United States Patent [19]
Toshihiro

[11] Patent Number: 5,123,459
[45] Date of Patent: Jun. 23, 1992

[54] FUEL TANK APPARATUS FOR USE IN VEHICLE

[75] Inventor: Shirakawa Toshihiro, Zama, Japan
[73] Assignee: Nissan Motor Company, Ltd., Yokohama, Japan
[21] Appl. No.: 710,876
[22] Filed: Jun. 6, 1991

[30] Foreign Application Priority Data

Jun. 6, 1990 [JP] Japan .................................. 2-147969

[51] Int. Cl.⁵ ........................................ F02M 33/02
[52] U.S. Cl. ........................................ 141/59; 123/520; 137/587; 220/746
[58] Field of Search .............. 141/59; 220/86.2, 89.1, 220/562, 4.14, 746, 749; 137/587, 588, 589; 123/516, 518, 519, 520, 521

[56] References Cited

U.S. PATENT DOCUMENTS

| | | | |
|---|---|---|---|
| 3,001,519 | 9/1961 | Dietrich et al. | 123/520 |
| 4,659,346 | 4/1987 | Uranishi et al. | 220/746 |
| 4,762,156 | 8/1988 | Rich | 141/59 |
| 4,815,436 | 3/1989 | Sasaki et al. | 123/520 |

FOREIGN PATENT DOCUMENTS 61-191427  8/1986  Japan .

*Primary Examiner*—Henry J. Recla
*Assistant Examiner*—Keith Kupferschmid
*Attorney, Agent, or Firm*—Pennie & Edmonds

[57] ABSTRACT

An improved fuel tank apparatus for use in a vehicle having a filler lid provided in a body of the vehicle includes a fuel tank in which fuel is to be stored, a filler tube connected to the fuel tank for introducing fuel into the fuel tank, a filler cap removably attached to an inlet port of the filler tube, a canister for absorbing and treating evaporated fuel generated in the fuel tank, an evaporation tube connected between the fuel tank and the canister, a check valve provided in the evaporation tube for releasing the evaporated fuel to the canister when pressure inside the fuel tank exceeds a predetermined level due to evaporation of the fuel in the fuel tank, and a mechanism for releasing the evaporated fuel which remains within the fuel tank due to the pressure inside the fuel tank being less than the predetermined level into the canister. The releasing mechanism is operated only when the filler lid is opened under the condition that the filler cap if closed. The releasing mechanism includes a bypass passage connected to the evaporation tube at the opposite sides of the check valve, an electromagnetic valve provided in the bypass passage for closing or opening the bypass passage, and a controlling circuit for controlling the electromagnetic valve such that the bypass passage is opened to release the evaporated fuel to the canister only when the filler lid is opened under the condition that filler cap is still closed.

9 Claims, 2 Drawing Sheets

FUEL TANK APPARATUS FOR USE IN VEHICLE

BACKGROUND OF THE INVENTION

1. Field of the Invention

The present invention relates to a fuel tank apparatus for use in a vehicle, and more particularly to an improved fuel tank apparatus for use in a vehicle which is constituted such that evaporated fuel within a fuel tank can be restrained from flowing out into the atmosphere through a filler tube upon filling fuel into the fuel tank.

2. Description of the Prior Art

A known fuel tank apparatus for a vehicle such as an automobile is for example illustrated in FIG. 1. As shown in FIG. 1, the known fuel tank apparatus comprises a fuel tank 1 for storing fuel therein. A filler tube 2 for introducing fuel into the fuel tank 1 is connected at one end thereof to the fuel tank 1. An inlet port is provided at the other end of the filler tube 2. A filler cap 3 is removably attached to the other end of the filler tube 2 so as to be able to close the inlet port thereof. A vent tube 4 for venting gas within the fuel tank 1 when the fuel is introduced into the fuel tank 1 is connected between the fuel tank 1 and the filler tube 2. Namely, one end of the vent tube 4 is connected to the upper portion of the fuel tank 1 and the other end thereof is connected to the filler tube 2 in the vicinity of the inlet port thereof. A canister for absorbing and then treating evaporated fuel generated in the fuel tank 1 is connected to the fuel tank through an evaporation tube 6 which is also connected at one end thereof to the upper portion of the fuel tank 1. A check valve 7 is provided in the evaporation tube 6. The check valve 7 is adapted to open to release the evaporated fuel from the fuel tank 1 to the canister 5 when pressure inside the fuel tank 1 exceeds a predetermined level due to evaporation of the fuel in the fuel tank 1.

An apparatus similar to the above-described apparatus is for example disclosed in Japanese Laid-open Patent Publication No. SHO 61-191427.

According to the known fuel tank apparatus as described above, it is possible to maintain the pressure inside the fuel tank 1 constant in the cases where the vehicle is not only running and but also standing, and restrain the evaporated fuel from flowing out into the atmosphere. That is, even if the pressure inside the fuel tank 1 is increased due to evaporation of the fuel in the fuel tank 1, the check valve 7 is opened so that the evaporated fuel within the fuel tank 1 is released into the canister 5 through the evaporation tube 6. The evaporated fuel which has been introduced into the canister 5 is then absorbed and treated therein, thereby enabling to prevent air pollution from being caused by flowout of the evaporated fuel.

On the other hand, however, the known fuel tank apparatus has the following problem. Namely, if the pressure inside the fuel tank 1 is less than the predetermined level but higher than the atmospheric pressure, the check valve is not operated and therefore the evaporated fuel still remains in the fuel tank. In this case, there is a possibility that the remaining evaporated fuel in the fuel tank 1 flows out to the atmosphere from the inlet port of the filler tube 2 when the filler cap 8 is removed upon filling fuel into the fuel tank 1. This problem may be overcome by setting the predetermined level as low as possible. However, this leads to the difficulties in adjustment of the check valve and design

SUMMARY OF THE INVENTION

In view of the problem as described above, it is therefore an object of the present invention to provide an improved fuel tank apparatus capable of restraining outflow of evaporated fuel remaining in a fuel tank upon filling fuel into the fuel tank.

In order to achieve the above object, the fuel tank apparatus according to the present invention comprises a fuel tank in which fuel is to be stored, a filler tube connected to the fuel tank for introducing fuel into the fuel tank, a filler cap removably attached to an inlet port of the filler tube, a canister for absorbing and then treating evaporated fuel generated in the fuel tank, an evaporation tube connected between the fuel tank and the canister, a check valve provided in the evaporation tube for releasing the evaporated fuel to the canister when pressure inside the fuel tank exceeds a predetermined level due to evaporation of the fuel in the fuel tank, and means for releasing the evaporated fuel to the canister when the pressure inside the fuel tank is less than the predetermined level but higher than the atmospheric pressure. The releasing means is operated only when a filler lid provided on a body of the vehicle is opened under the condition that the filler cap is still closed.

According to the fuel tank apparatus having the above structure, the evaporated fuel which remains in the fuel tank due to the pressure inside the fuel tank being less than the predetermined level is released into the canister, when the filler lid is opened in order to fill fuel into the fuel tank. The remaining evaporated fuel is absorbed and then treated in the canister. Therefore, even when the filler cap is subsequently removed in order to fill the fuel into the fuel tank, there is less possibility that the evaporated fuel remaining in the fuel tank will flow out from the inlet port of the filler tube into the atmosphere, thus resulting in preventing air pollution.

In this invention, the releasing means can be constituted from a bypass passage connected to the evaporation tube at the opposite sides of the check valve, an electromagnetic valve provided in the bypass passage for closing and opening the bypass passage, and a controlling means for controlling the electromagnetic valve such that the bypass passage is opened to release the evaporated fuel to the canister when the filler lid is opened under the condition that filler cap is still closed.

The controlling means can be constituted from first means for detecting as to whether the filler lid is opened or not, second means for detecting as to whether the filler cap is opened or not, and an electrical circuit for operating the electromagnetic valve in response to the first and second detecting means. In this case, the first detecting means is a lid switch which is turned on when the filler lid is closed and tuned off when the filler lid is opened, the second detecting means is a cap switch which is turned on when the filler cap is closed and turned off when the filler cap is opened, and the electrical circuit comprises a first relay having a relay contact which is switchable between two sides in response to the lid switch and a second relay having a relay contact which is switchable between two sides in response to the cap switch.

The electromagnetic valve is energized to close the bypass passage when both of the relay contacts of the first and second relay are in the one sides or the other sides, and deenergized to open the bypass passage when the relay contact of the first relay is switched from the other side to the one side due to the lid switch being turned off under the condition that the cap switch is still turned on.

DETAILED DESCRIPTION OF THE PREFERRED EMBODIMENT

Figure 1:
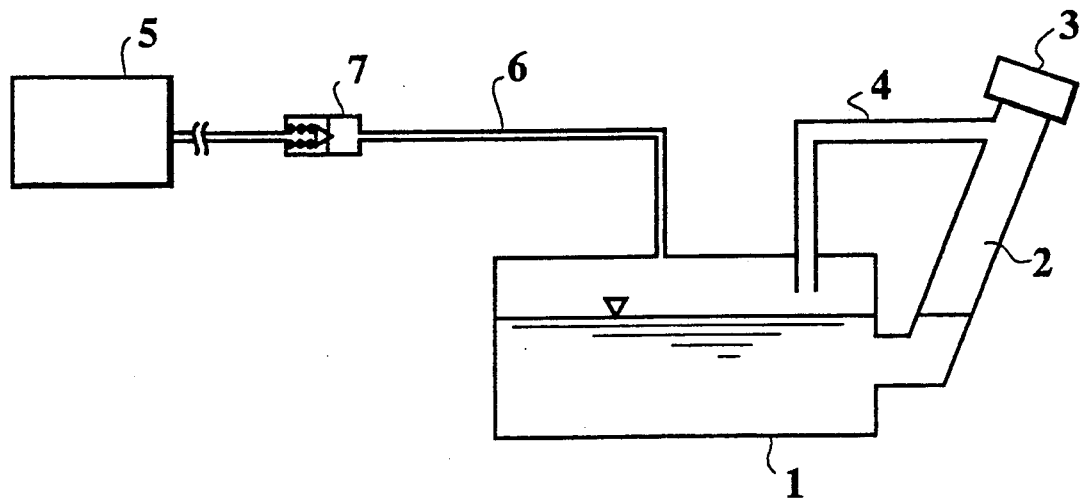
FIG. 1 is a schematic view of the known fuel tank apparatus.

Referring now to the drawings, a preferred embodiment of this invention will be described.

Figure 2:
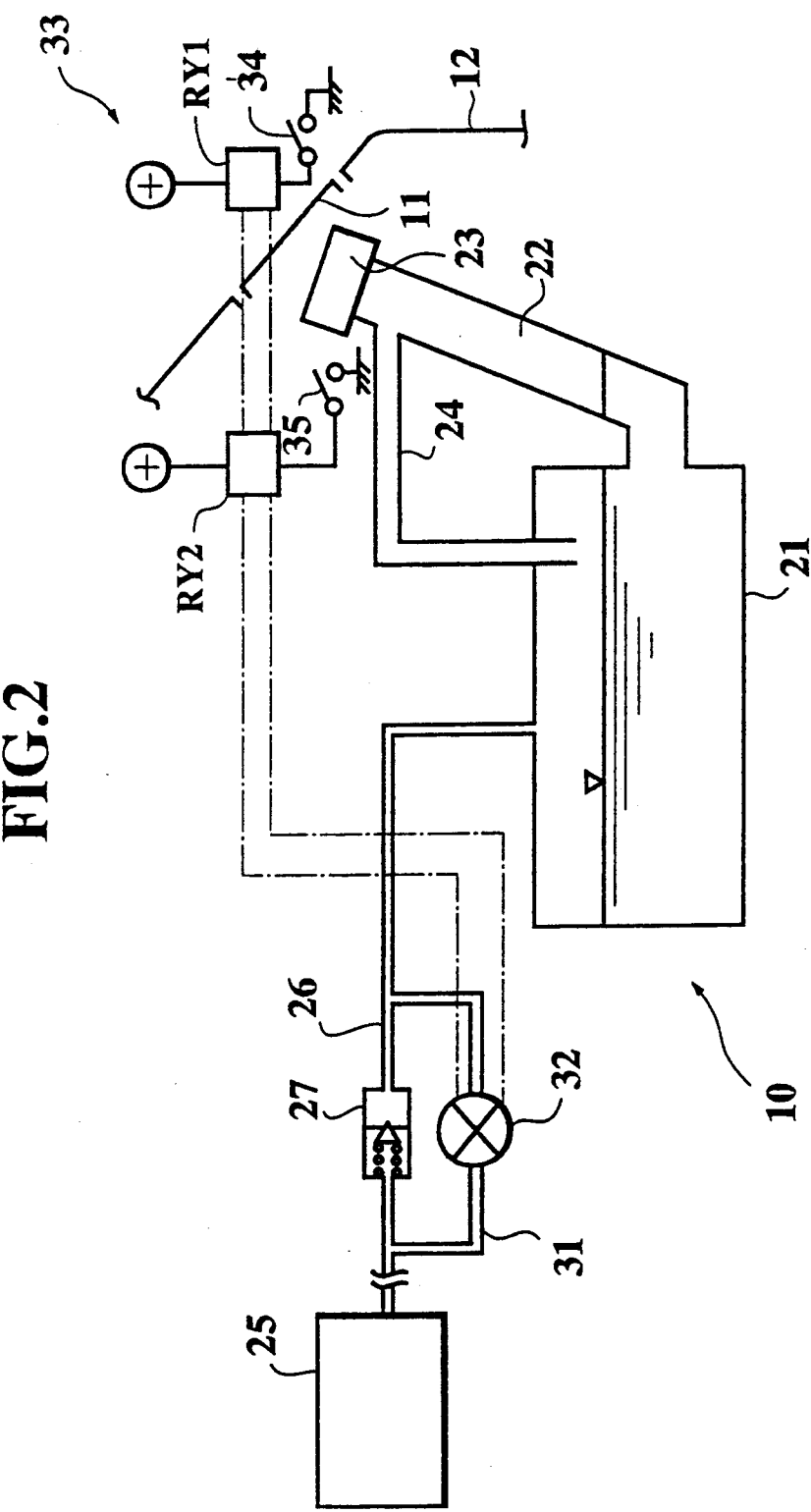
FIG. 2 is a schematic view of an embodiment of a fuel tank apparatus according to the present invention.

In FIG. 2, the reference numeral 10 designates a fuel tank apparatus according to the embodiment. The fuel tank apparatus 10 is used in a vehicle such as, for example, an automobile which has a filler lid 11 provided in a body 12 of the vehicle. The filler lid 11 is normally closed, but opened when fuel is filled to the vehicle.

The fuel tank apparatus 10 includes a fuel tank 21 for storing fuel therein. In the same manner as the known apparatus as described above, a filler tube 22 for introducing fuel into the fuel tank 21 is connected at one end thereof to the fuel tank 21. An inlet port is provided at the other end of the filler tube 22, and a filler cap 23 is removably attached to the other end of the filler tube 22 so as to close the inlet port thereof. The filler cap 23 is located at the position where it will be exposed when the filler lid 11 is opened. A vent tube 24 for venting gas within the fuel tank 21 when fuel is introduced into the fuel tank 21 is connected between the fuel tank 21 and the filler tube 22. Namely, one end of the vent tube 24 is connected to the upper portion of the fuel tank 21 and the other end thereof is connected to the filler tube 22 in the vicinity of the inlet port thereof. An evaporation tube 26 is also connected at one end thereof to the upper portion of the fuel tank 21. A canister 25 for absorbing and then treating evaporated fuel generated in the fuel tank 21 is connected to the other end of the evaporation tube 26 to communicate with the fuel tank through the evaporation tube 26. A check valve 27 is provided in the evaporation tube 26. The check valve 27 is constituted so as to be opened to release the evaporated fuel from the fuel tank 21 to the canister 25 only when pressure inside the fuel tank 21 exceeds a predetermined level.

In the tank apparatus according to this embodiment, there is provided an additional release unit for releasing evaporated fuel remaining in the fuel tank 21 in a case where pressure inside the fuel tank 21 is less than the predetermined level but higher than the atmospheric pressure into the canister 25. The release unit is constituted so as to be operated only when the filler lid 11 is opened in order to fill fuel into the fuel tank 21 under the condition that the filler cap 23 is still closed.

The release unit includes a bypass passage 31 connected to the evaporation tube 26 at the opposite sides of the check valve 27 so as to bypass the check valve 27 and an electromagnetic shut-off valve 32 provided in the bypass passage 31 for closing and opening the bypass passage 31. The electromagnetic shut-off valve 32 is operated only when the filler lid 11 is opened under the condition that the filler cap 23 is still closed to release the evaporated fuel in the fuel tank 21 which remains in the fuel tank 21 due to the pressure inside the tank 21 being less than the predetermined level into the canister 25. This is because the pressure inside the fuel tank 21 which is less than the predetermined level does not operate the check valve 27.

The release unit further includes a control means 33 for controlling the electromagnetic shut-off valve 32. The control means 33 comprises a lid switch 34 for detecting as to whether the filler lid 11 is opened or not, a cap switch 35 for detecting as to whether the filler cap 23 is opened or not, and an electrical circuit 36 for operating the electromagnetic valve 32 in response to the lid and cap switches 34 and 35. The lid switch 34 is constituted such that it is normally turned on when the filler lid 11 is closed, but turned off only when the filler lid 11 is opened. The filler cap switch 35 is also constituted such that it is normally turned on when the filler cap 23 is closed, but turned off only when the filler cap 23 is opened in order to fill fuel from the inlet port of the filler tube 22.

Figure 3:
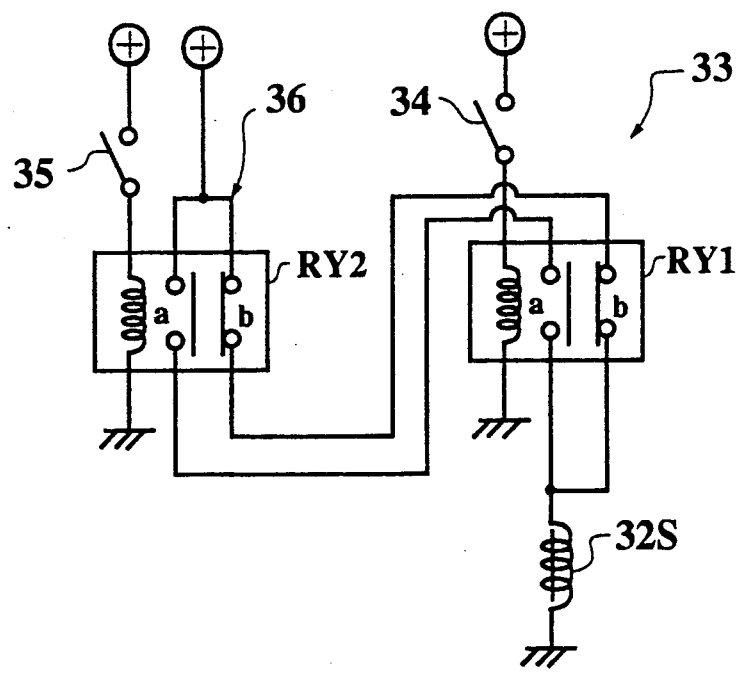
FIG. 3 is a circuit diagram of a control circuit incorporated in the fuel tank apparatus of this embodiment.

FIG. 3 shows the electrical circuit 36. The electrical circuit 36 includes a first relay RY1 having a relay contact which is movable between a side "a" and a side "b" in response to the switching of the lid switch 34, and a second relay RY2 having a relay contact which is movable between a side "a" and a side "b" in response to the switching of the cap switch 35. The relay contact of the first relay RY1 is constituted such that it is moved to the side "b" from the side "a" when the lid switch 34 is turned off, that is the filler lid 11 is opened. The relay contact of the second relay RY2 is also constituted such that it is moved to the side "b" from the side "a" when the cap switch 35 is turned off, that is the filler cap 23 is opened. Further, in this electrical circuit 36 when both of the contacts of the first and second relays RY1 and RY2 are switched to the side "a" or "b", a solenoid 32S of the electromagnetic shut-off valve 32 is energized and then the electromagnetic shut-off valve 32 is operated so as to close the bypass passage 31. On the other hand, when either of the contacts of the first and second relays RY1 and RY2 is switched to the side "b" from the side "a" or to the side "a" from the side "b", the solenoid 32S of the electromagnetic shut-off valve 32 is deenergized and then the electromagnetic valve 32 is operated so as to open the bypass passage 31.

The aforesaid relationship between the bypass passage 31 and lid and cap switches 34 and 35 is summarized in the following table. In this regard, it should be noted that a case that the filler cap 23 is opened under the condition that the filler lid is closed has been omitted, because such a case will not be actually happened.

TABLE

|  |  | LID SWITCH | CAP SWITCH | BYPASS PASSAGE |
|---|---|---|---|---|
| AT RUNNING |  | ON | ON | CLOSE |
| AT FILLING OF FUEL | LID OPEN | OFF | ON | OPEN |
|  | LID OPEN AND CAP OPEN | OFF | OFF | CLOSE |

According to the vehicle having the above tank apparatus, when the the vehicle is running, the lid switch 34 and cap switch 35 are turned on since the filler lid 11 and filler cap 23 are closed in this situation. Therefore, the relay contacts of the first and second relays RY1 and RY2 are in the side "a", respectively, so that the solenoid 32S is energized and therefore the electromagnetic shut-off valve 32 is operated to close the bypass passage 31. In this situation, when the pressure inside the fuel tank 21 exceeds the predetermined level, the check valve 27 provided in the evaporation tube 26 is opened so as to release the evaporated fuel within fuel tank 21 into the canister 25, so that the pressure inside the fuel tank 21 is kept constant. Further, since the evaporated fuel released into the canister 25 is absorbed and then treated therein, it becomes possible to prevent the evaporated fuel from flowing out into the atmosphere.

On the other hand, when fuel is filled to the fuel tank 21 of the vehicle, the additional release unit is operated as follows. Namely, in order to fill the fuel into the fuel tank 21, the filler lid 11 is first opened under the condition that the filler cap 23 is still closed. According to the tank apparatus of this embodiment, when the filler lid 11 is opened, the lid switch 34 is turned off and then the relay contact of the relay RY1 is switched from the side "a" to the side "b" as previously described. In this condition, since the filler cap 23 is still closed, the cap switch 35 is turned on and the relay contact of the second relay RY2 is in the side "a". Therefore, the solenoid 32S of the electromagnetic shut-off valve 32 is deenergized and then the shut-off valve 32 is not operative, so that the bypass passage 31 is opened. In this case, if the pressure inside the fuel tank is higher than the atmospheric pressure but less than the predetermined level due to evaporation of the fuel in fuel tank 21, the evaporated fuel can be released into the canister 25 through the bypass passage 31, so that the pressure inside the fuel tank 21 is lowered to the level substantially the same as the atmospheric pressure. Therefore, when the filler cap 23 is subsequently opened in order to fill the fuel into the fuel tank 21, there is less possibility that the evaporated fuel within the tank flows out from the inlet port of the filler tube 22. In this case, the cap switch 35 is turned off when the filler cap 23 is opened, so that the relay contact of the second relay RY2 is then switched from the side "a" to the side "b". Therefore, since the relay contacts of the first and second relays RY1 and RY2 are both in the side "b" under the condition, the solenoid 32S of the electromagnetic valve 32 is energized to close the bypass passage 31.

As described in the foregoing, according to the tank apparatus of this embodiment, the evaporated fuel in the tank 25 is almost released into the canister 25 when the filler lid 11 is opened in order to fill fuel into the fuel tank under the condition that the filler cap 23 is still closed. Therefore, when the filler cap 23 is subsequently removed, there is less possibility that the evaporated fuel still remaining in the tank flows out into the atmospheric through the inlet port of the filler tube 22, thus resulting in preventing air pollution.

Finally, it should be noted that when the vehicle is standing, no electricity is supplied to the control circuit. However, in this apparatus, it may be possible that the electromagnetic valve is designed so as to keep the bypass passage close even if no electricity is supplied to the control circuit. In this case, therefore, evaporated fuel generated in the fuel tank is released through the check valve.

What is claimed is:

1. A fuel tank apparatus for use in a vehicle having a filler lid provided in a body of the vehicle, comprising:
a fuel tank in which fuel is to be stored;
a filler tube connected to the fuel tank for introducing fuel into the fuel tank, the filler tube having an inlet port;
a filler cap removably attached to the inlet port of the filler tube;
a canister for absorbing and then treating the evaporated fuel generated in the fuel tank;
an evaporation tube connected between the fuel tank and the canister;
a check valve provided in the evaporation tube for releasing the evaporated fuel to the canister when pressure inside the fuel tank exceeds a predetermined level due to evaporation of the fuel in the fuel tank; and
means for releasing the evaporated fuel to the canister when the pressure inside the fuel tank is less than the predetermined level but higher than the atmospheric pressure, the releasing means being operated only when the filler lid is opened under the condition that the filler cap is closed.

2. The fuel tank apparatus as claimed in claim 1, wherein the check valve has opposite sides, the evaporation tube has opposite portions each connected to said check valve opposite sides, and the releasing means comprising a bypass passage connected to said opposite portions of the evaporation tube, an electromagnetic valve provided in the bypass passage for closing or opening the bypass passage, and means for controlling the electromagnetic valve such that the bypass passage is opened to release the evaporated fuel to the canister only when the filler lid is opened under the condition that filler cap is still closed.

3. The fuel tank apparatus as claimed in claim 2, wherein the the controlling means comprising first means for detecting as to whether the filler lid is opened or not, second means for detecting as to whether the filler cap is opened or not, and an electrical circuit for operating the electromagnetic valve in response to the first and second detecting means.

4. The fuel tank apparatus as claimed in claim 3, wherein the first detecting means comprises a lid switch which is turned on when the filler lid is closed and tuned off when the filler lid is opened, the second detecting means comprises a cap switch which is turned on when the filler cap is closed and turned off when the filler cap is opened, and the electrical circuit comprises a first relay which is operated in response to the lid switch and a second relay which is operated in response to the cap switch.

5. The fuel tank apparatus as claimed in claim 4, wherein the electrical circuit is constituted such that electromagnetic valve is energized to close the bypass passage when both of the lid and cap switches are turned on or off, and such that the electromagnetic valve is deenergized to open the bypass passage when either of the switches is turned off.

6. The fuel tank apparatus as claimed in claim 5, wherein each of the first and second relays has a relay contact which is switchable between two sides, in which the relay contact of the first relay is constituted such that the contact is switched from one side to the other side when the lid switch is turned off, and the relay contact of the second relay is also constituted such that the contact is switched from one side to the other side when the cap switch is turned off, and the electromagnetic valve is constituted so as to be energized to close the bypass passage when both of the relay contacts of the first and second relay are in the one sides or the other sides, and such that the electromagnetic valve is deenergized to open the bypass passage when the relay contact of the first relay is switched from the one side to the other side due to the lid switch being turned off under the condition that the cap switch is turned on.

7. A fuel tank apparatus for use in a vehicle having a filler lid provided in a body of the vehicle, comprising:
a fuel tank in which fuel is to be stored;
a filler tube connected to the fuel tank for introducing fuel into the fuel tank, the filler tube having an inlet port;
a filler cap removably attached to the inlet port of the filler tube;
means for absorbing and treating evaporated fuel generated in the fuel tank;
means for connecting the absorbing and treating means to the fuel tank;
first means provided in the connecting means for releasing the evaporated fuel to the absorbing and treating means when pressure inside the fuel tank exceeds a predetermined level due to evaporation of the fuel in the tank; and
second means for releasing the evaporated fuel which remains within the fuel tank when the pressure inside the fuel tank is less than the predetermined level into the absorbing and treating means, the second releasing means being operated only when the filler lid is opened under the condition that the filler cap is closed.

8. A fuel tank apparatus as claimed in claim 7, wherein the second releasing means comprising a bypass passage connected to the connecting means for bypassing the first releasing means, means provided in the bypass passage for closing and opening the bypass passage, and means for controlling the closing and opening means such that the bypass passage is opened to release the evaporated fuel to the absorbing and treating means when the filler lid is opened under the condition that filler cap is still closed in order to fill fuel to the fuel tank.

9. A fuel tank apparatus for use in a vehicle having a filler lid provided in a body of the vehicle, comprising:
a fuel tank in which fuel is to be stored, the fuel tank having a vent tune for venting gas in the fuel tank;
a filler tube connected to the fuel tank for introducing fuel into the fuel tank, the filler tube having an inlet port;
a filler cap removably attached to the inlet port of the filler tube;
a canister for absorbing and then treating evaporated fuel generated in the fuel tank;
an evaporation tube connected between the fuel tank and the canister;
a check valve provided in the evaporation tube for releasing the evaporated fuel to the canister when pressure inside the fuel tank exceeds a predetermined level due to evaporation of the fuel in the tank;
a bypass conduit for bypassing the check valve in the evaporation tube;
an electromagnetic shut-off valve provided in the bypass conduit;
a lid switch for detecting as to whether the filler lid is opened or not;
a cap switch for detecting as to whether the filler cap is opened or not; and
a control circuit which operates the electromagnetic shut-off valve so as to open the bypass conduit when the lid switch detects that the filler lid is opened and the cap switch detects that the filler cap is closed, whereby releasing to the canister the evaporated fuel in the fuel tank which remains in the fuel tank due to the pressure inside the fuel tank being less than the predetermined level.

* * * * *